Aug. 1, 1933.  W. JUCHHEIM ET AL  1,920,925
ELECTRICALLY OPERATED VALVE
Filed Feb. 23, 1932

Inventors:
Wilhelm Juchheim
Ernst Juchheim

Patented Aug. 1, 1933

1,920,925

UNITED STATES PATENT OFFICE 1,920,925

ELECTRICALLY OPERATED VALVE

Wilhelm Juchheim and Ernst Juchheim, Ilmenau, Germany

Application February 23, 1932, Serial No. 594,522, and in Germany November 19, 1931

2 Claims. (Cl. 137—139)

This invention relates to valves, and more especially to a valve of the electrically operated type particularly adapted for use with gas and liquids, the main object being to have the said valve constructed of glass; and the invention has for its object to provide improvements of the general character stated which will be superior in point of simplicity, inexpensiveness of construction, durability and serviceability, since by the use of a glass-made valve, rusting-in, jamming and oiling thereof will be completely avoided. As a further advantage, a valve of such kind may be employed for purposes where metallic-made valves, owing to their cost of manufacturing being too high, cannot be used at all.

In the accompanying drawing, we have shown one form of embodiment of our improved construction, and in this drawing.

Figure 1:
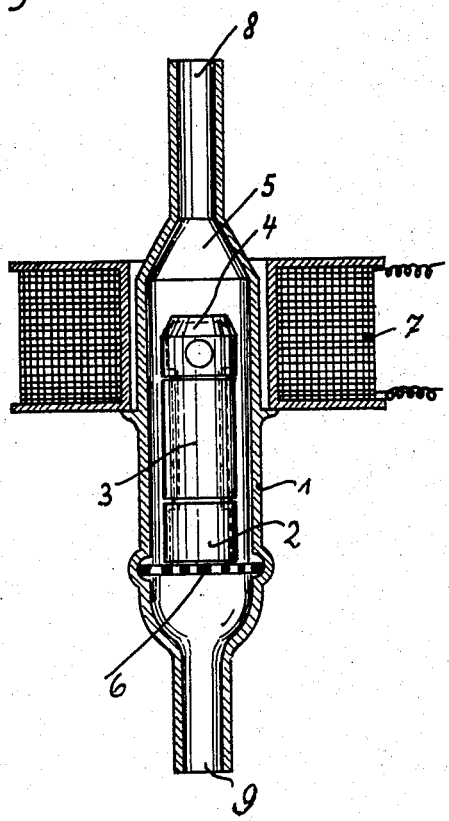
Fig. 1 is a vertical cross-section.
Figure 2:
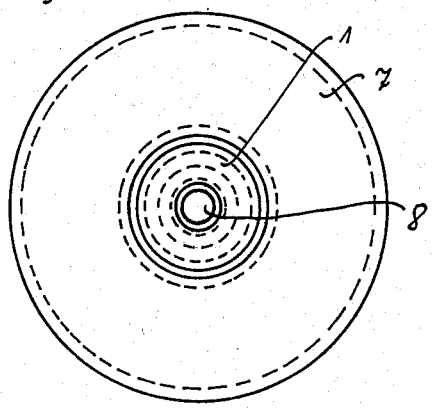
Fig. 2 is a plan of the device.

The numeral 1 indicates the body of the valve, which in the present instance is shown as being cylindrical in shape, and made of glass, said glass-cylinder having a glass-made piston 2 arranged within it, this piston being surrounded by a magnetic envelop, as at 3. The top of said piston and the upper part of said glass-cylinder are formed to perfectly ground cone surfaces of identical shape, as at 4 and 5, respectively, the cone surface 5 serving as valve seat. The glass cylinder which is open at its ends, has suitably spaced from its lower extremity, an outwardly directed, enlarged portion of annular shape, and in this projecting portion, there may be disposed a sieve 6 serving as a support for said glass piston 2. Intermediate said enlarged portion and the cone surface of the glass cylinder, the latter carries exteriorly an annular projection designed to support a field coil 7 which is so positioned as to surround the glass cylinder in its upper part. The cylinder 1 is provided at its open ends with tubular elongations 8 and 9 respectively, the former serving as outlet, for instance for gas, and the latter as inlet.

In operation:

As soon as an electric current is, over a contact device (not shown), sent into the field coil 7, the piston 2 owing to the magnetic material surrounding it and acting in the manner of a solenoid, is forced up to the position in which the cone surface 4 intimately contacts with the cone surface 5, thereby closing the valve. When the current becomes interrupted, the piston 2 owing to its initial weight, falls back upon its support 6, thereby opening the valve.

It is to be understood that the invention is not limited to the precise construction set forth. For instance, the arrangement might be made so that the two cone surfaces for contacting purposes be provided for in reversed position, that is to say in the lower part in lieu of in the upper part. In this case, the valve is in closed position when the electric current has become interrupted. Such a modification may be made by those skilled in the art without departing from the spirit of our invention.

We shall now describe one of the numerous possibilities of application of our improved valve. Let it be assumed that, by means of an electrically operated contact thermometer, a gas flame has to be extinguished at a determined degree of temperature, and that the said gas flame has to be lighted again automatically as soon as the temperature will descend under said degree of contact making. The manner of operating is as follows:

The supply of gas to a burner is caused to pass through the cylinder 1 and through the outlet 8 before being introduced into said burner. The latter is provided with a pilot flame to which supply of gas is conducted through a separate bypass and which is designed to ignite the main flame. The supply of electric current to the field coil 7 is branched over a contact thermometer which brings about a contact as soon as a determined degree of temperature has been reached, and which breaks the said contact on the temperature continuing to rise. Now, when the temperature marked by the thermometer, rises up to a determined degree, a contact is thus brought about, and said contact will close the circuit for the coil 7 and force the said piston 2 up into its end position, thereby closing the valve and shutting off the supply of gas, so that the main burner flame is caused to extinguish. If the temperature within reach of the contact thermometer descends under said degree of contact making, then the supply of electric current to the field coil becomes automatically interrupted, the piston 2 owing to its initial weight, falls back upon its seat and opens the valve, thereby reestablishing supply of gas which, by means of the pilot flame, becomes ignited, and so on. Owing to this arrangement, it will be possible to have a temperature within determined limits maintained constant.

It is still to be observed that cylinder 1 and piston 2 might also be made of non-magnetic metal.

What we claim is:—

1. An electrically operated valve for gas and liquids, comprising in combination, the valve body proper having the shape of a cylinder and being made of glass, the said cylinder being open at its ends and made integral with tubular elongations serving as inlet and outlet for gas and liquids, a piston made of glass arranged within said cylinder, the top of said piston and the upper part of said cylinder having perfectly ground cone surfaces of identical shape, the cone surface of said cylinder serving as valve seat, a magnetic envelop surrounding the body of said glass-made piston, an annular, enlarged portion formed in the lower part of said cylinder, a sieve disposed in said enlarged portion and adapted to support said piston in its inoperative position, a field coil, an annular projection carried exteriorly by said cylinder and situated intermediate said sieve and said cone surface of the cylinder, the said projection being adapted for supporting said field coil which embraces said cylinder, said field coil when receiving current over a contact device, influencing said magnetic envelop in the manner of a solenoid and causing raising movement to said piston up to the valve seat, thereby shutting off passage of supply, the interruption of current causing said piston to fall by its initial weight down upon the said supporting sieve, thereby opening the valve.

2. An electrically operated valve for gas and liquids, having a cylindrically shaped valve body made of glass, open at its ends which form inlet and outlet, respectively, and a valve seat therein, comprising the valve being made in the shape of a glass-piston, magnetic material made in the shape of an envelop entirely surrounding said glass-piston, and means for operating said piston.

WILHELM JUCHHEIM.
ERNST JUCHHEIM.